US011023540B2

(12) United States Patent
Guo et al.

(10) Patent No.: US 11,023,540 B2
(45) Date of Patent: Jun. 1, 2021

(54) WEB PAGE CLUSTERING METHOD AND DEVICE

(71) Applicants: NSFOCUS INFORMATION TECHNOLOGY CO., LTD., Beijing (CN); NSFOCUS TECHNOLOGIES,INC., Beijing (CN)

(72) Inventors: Yangyang Guo, Beijing (CN); Shaobin Liu, Beijing (CN); Fei Li, Beijing (CN); Hu Li, Beijing (CN); Lijun Liu, Beijing (CN)

(73) Assignees: NSFOCUS INFORMATION TECHNOLOGY CO., LTD., Beijing (CN); NSFOCUS TECHNOLOGIES, INC., Beijing (CN)

(*) Notice: Subject to any disclaimer, the term of this patent is extended or adjusted under 35 U.S.C. 154(b) by 168 days.

(21) Appl. No.: 16/463,084

(22) PCT Filed: Nov. 24, 2017

(86) PCT No.: PCT/CN2017/112883
§ 371 (c)(1),
(2) Date: May 22, 2019

(87) PCT Pub. No.: WO2018/095411
PCT Pub. Date: May 31, 2018

(65) Prior Publication Data
US 2019/0377765 A1  Dec. 12, 2019

(30) Foreign Application Priority Data

Nov. 25, 2016 (CN) .......................... 201611068233.0

(51) Int. Cl.
*G06F 16/95* (2019.01)
*G06F 16/951* (2019.01)
(Continued)

(52) U.S. Cl.
CPC ........ *G06F 16/951* (2019.01); *G06F 16/9566* (2019.01); *G06F 16/986* (2019.01)

(58) Field of Classification Search
CPC ...................................................... G06F 16/951
(Continued)

(56) References Cited

U.S. PATENT DOCUMENTS 7,962,523 B2 * 6/2011 Poola .................. G06F 16/9566
707/796
2003/0061490 A1 * 3/2003 Abajian .................. G06F 16/48
713/176
(Continued)

FOREIGN PATENT DOCUMENTS

CN        102902790 A    1/2013
CN        102902794 A    1/2013
(Continued)

OTHER PUBLICATIONS

International Search Report for corresponding App. No. PCT/CN2017/112883, dated Dec. 20, 2017.

*Primary Examiner* — Syling Yen
(74) *Attorney, Agent, or Firm* — Renner, Otto, Boisselle & Sklar, LLP

(57) ABSTRACT

A web page clustering method and device, used for clustering web pages according to a web page framework, the method including: acquiring uniform resource locators (URL) of a plurality of web pages to be clustered; for the URL of each web page to be clustered, determining rewriting rules of the URL and classifying the URL according to the rewriting rules of the URL; determining a web page framework of the web page corresponding to each URL in each URL class, and determining whether each URL may be clustered according to the web page framework of the web (Continued)

page corresponding to each URL; and retaining the URL class if each URL may be clustered.

9 Claims, 3 Drawing Sheets

(51) Int. Cl.
  *G06F 16/958* (2019.01)
  *G06F 16/955* (2019.01)
(58) Field of Classification Search
  USPC .......................................................... 707/722
  See application file for complete search history.

(56) References Cited

U.S. PATENT DOCUMENTS

| | | | |
|---|---|---|---|
| 2006/0218143 | A1* | 9/2006 | Najork .................. G06F 16/951 |
| 2007/0294252 | A1 | 12/2007 | Fetterly |
| 2011/0307436 | A1* | 12/2011 | Cai ....................... G06F 16/322 |
| | | | 706/48 |
| 2015/0161278 | A1 | 6/2015 | Cai |
| 2017/0286544 | A1* | 10/2017 | Hunt .................. H04L 63/0876 |

FOREIGN PATENT DOCUMENTS

| | | |
|---|---|---|
| CN | 103136212 A | 6/2013 |
| CN | 103631787 A | 3/2014 |
| CN | 104699835 A | 6/2015 |
| CN | 106095979 A | 11/2016 |
| CN | 106708952 A | 5/2017 |

\* cited by examiner

WEB PAGE CLUSTERING METHOD AND DEVICE

This application is a National Stage of International Application No. PCT/CN2017/112883, filed on Nov. 24, 2017, which claims the priority of Chinese Patent Application No. 201611068233.0, filed with the Chinese Patent Office on Nov. 25, 2016, and entitled "A method and apparatus for clustering web page", both of which is hereby incorporated by reference in their entireties.

FIELD

The present invention relates to the field of Internet technologies, and particularly to a method and apparatus for clustering web page.

BACKGROUND

At present, web pages are generally clustered based upon a text characteristic of the web pages, that is, key items or frequently occurring words are extracted as characteristic values for clustering so that the pages including the similar items are clustered together. This can only be applicable to textual searching or other textual processing for purpose of significantly improving the efficiency of processing.

However, a web page including a text characteristic is further characterized in a hyperlink, semi-structured items, a large scale, heterogeneous formats, etc., and there may be different text characteristics of the same class of web pages in the same web page framework, that is, if the web pages are clustered according to their text characteristics, then the web pages in the same framework may not be clustered together, so clustering of web pages based upon their text characteristics may not be applicable to web pages to be clustered based upon their framework. There is the service flow or data processing flow of pages in the same framework, and if the pages in the same framework can be clustered together, then one of the pages may represent this class of pages. With this technology of clustering web pages, the efficiency of applications for handling a large framework-based web site, e.g., Crawler, Site Map, bug detection, etc., can be improved while guaranteeing an all-around result. Accordingly it has been absent in the prior art a solution to clustering web pages based upon their framework.

SUMMARY

Embodiments of the invention provide a method and apparatus for clustering web pages so as to address the problem in the prior art that web pages cannot be clustered based upon their framework.

Some embodiments of the invention provide a method for clustering web pages, the method including:
acquiring Uniform Resource Locators (URLs) of a plurality of pages to be clustered;
determining a rewriting rule of the URL of each of the pages to be clustered, and classifying the URL according to the rewriting rule of the URL; and
determining page frameworks of the pages corresponding to the respective URLs in respective URL classes, determining whether the respective URLs can be clustered, according to the page frameworks of the pages corresponding to the respective URLs, and if so, reserving the URL class.

Optionally, determining the rewriting rule of the each URL of each page to be clustered, and classifying the URL according to the rewriting rule of the URL includes:
determining the URLs of the plurality of pages to be clustered as a set of URLs;
extracting a rewriting rule of two different URLs from any two different URLs in the set of URLs;
determining whether the rewriting rule of the two different URLs is a trustable rewriting rule, and if so, searching the set of URLs for URLs satisfying the trustable rewriting rule, and determining the URLs satisfying the trustable rewriting rule as a same URL class; and
deleting the URLs in the same URL class from the set of URLs, and returning to a step of extracting a rewriting rule of two different URLs from any two different URLs in the set of URLs.

Optionally, extracting the rewriting rifle of two different URLs from the any two different URLs in the set of URLs includes:
extracting a first URL and a second URL from the set of URLs, and determining a rewriting rule of the first URL and the second URL; and the method further includes:
if the rewriting rule of the first URL and the second URL is a rewriting rule which is not trustable, then extracting a third URL and a fourth URL from the set of URLs, determining a rewriting rule of the third URL and the fourth URL, and returning to the step of determining the rewriting rule of the two different URLs is a trustable rewriting rule, wherein at least one of the third URL and the fourth URL is another URL in the set of URLs than the first URL and the second URL.

Optionally, if a representation form of the rewriting rule is all letters or all digits, the number of which is not determinate, the rewriting rule will be not trustable.

Optionally, determining the page frameworks of the pages corresponding to the respective URLs in each URL class, determining whether the respective URLs can be clustered, according to the page frameworks of the pages corresponding to the respective URLs includes:
acquiring a Hyper Text Markup Language (HTML) file of a page corresponding to each URL in the respective URL classes; and acquiring fingerprint characteristic values of the HTML file according to labels in the HTML file;
determining whether differences between the fingerprint characteristic values of the respective URLs are below a preset threshold; and
if so, determining that the respective URLs can be clustered.

Optionally, acquiring the fingerprint characteristic values of the HTML file according to the labels in the HTML file includes:
extracting attribute values of the respective labels from the HTML file, wherein different attributes correspond to their respective attribute weights;
determining positional weights of the respective labels according to different positions of the respective labels in the HTML file; and
acquiring the fingerprint characteristic values of the HTML file according to the positional weights of the respective labels, and the attribute values and the attribute weights of the different attributes in the respective labels.

Optionally, acquiring the fingerprint characteristic values of the HTML file according to the positional weights of the respective labels, and the attribute values and the attribute weights of the different attributes in the respective labels includes:

dividing the HTML file into three components including head, middle, and tail components, wherein a positional weight of a label at the head position is higher than a positional weight of a label at the middle position, and a positional weight of a label at the tail position is higher than a positional weight of the label at the middle position; and determining attributes of a label as an identity attribute, a class attribute, and non-typical attributes including other attributes than the identity and class attributes, wherein an attribute weight of the identity attribute is higher than an attribute weight of a non-typical attribute, and an attribute weight of the class attribute is higher than an attribute weight of the non-typical attribute.

Some embodiments of the invention provide an apparatus for clustering web pages, the apparatus including:

a crawling module configured to acquire Uniform Resource Locators (URLs) of a plurality of pages to be clustered;

a classifying module configured to determine, a rewriting rule of the URL of each page to be clustered, and to classify the URL according to the rewriting rule of the URL; and a determining module configured to determine page frameworks of the pages corresponding to the respective URLs in each URL class, to determine whether the respective URLs can be clustered, according to the page frameworks of the pages corresponding to the respective URLs, and if so, to reserve the URL class.

Optionally the classifying module is configured:

to determine the URLs to the plurality of pages to be clustered as a set of URLs;

to extract a rewriting rule of two different URLs from any two different URLs in the set of URLs;

to determine whether the rewriting rule of the two different URLs is a trustable rewriting rule, and if so, to search the set of URLs for URLs satisfying the trustable rewriting rule, and determining those URLs as the same URL class; and to delete the URLs in the same URL class from the set of URLs, and to return to the operation of extracting a rewriting rule of two different URLs from any two different URLs in the set of URLs.

Optionally, the classifying module is further configured:

to extract a first URL and a second URL from the set of URLs, and to determine a rewriting rule of the first URL and the second URL; and the classifying module is further configured:

when the rewriting rule of the first URL and the second URL is a rewriting rule which is not trustable, to extract a third URL and a fourth URL from the set of URLs, to determine a rewriting rule of the third URL and the fourth URL, and to return to the operation of determining the rewriting rule of the two different URLs is a trustable rewriting rule, wherein at least one of the third URL and the fourth URL is another URL in the set of URLs than the first URL and the second URL.

Optionally, the classifying module configured to determine whether the rewriting rule is trustable is configured:

if a representation form of the rewriting rule is all letters or all digits, the number of which is not determinate, to determine the rewriting rule is not trustable.

Optionally, the determining module is configured:

to acquire a Hyper Text Markup Language (HTML) file of a page corresponding to the URL in the respective URL classes; and to acquire fingerprint characteristic values of the HTML file according to labels in the HTML file;

to determine whether differences between the fingerprint characteristic values of the respective URLs are below a preset threshold; and if so, to determine that the respective URLs can be clustered.

Optionally, the determining module is configured:

to extract attribute values of the respective labels from the HTML file, wherein different attributes correspond to their respective attribute weights;

to determine positional weights of the respective labels according to different positions of the respective labels in the HTML file; and to acquire the fingerprint characteristic values of the HTML file according to the positional weights of the respective labels, and the attribute values and the attribute weights of the different attributes in the respective labels.

Optionally, the determining module is configured:

to divide the HTML file into three components including head, middle, and tail components, wherein a positional weight of a label at the head position is higher than a positional weight of a label at the middle position, and a positional weight of a label at the tail position is higher than a positional weight of the label at the middle position; and to determine attributes of a label as an identity attribute, a class attribute, and non-typical attributes including other attributes than the identity and class attributes, wherein an attribute weight of the identity attribute is higher than an attribute weight of a non-typical attribute, and an attribute weight of the class attribute is higher than an attribute weight of the non-typical attribute.

Some embodiments of the invention provide a computer readable storage medium storing computer executable instructions for causing a computer upon being executed on the computer to perform the method according to any one of embodiments above of the invention.

Some embodiments of the invention provide a computing device including:

a memory configured to store program instructions; and a processor configured to execute the program instructions stored in the memory, and to perform the method according to any one of the embodiments above of the invention according to the executed program instructions.

Some embodiments of the invention provide a computer program product for causing a computer upon being executed on the computer to perform the method according to any one of the embodiments above of the invention.

In summary, embodiments of the invention provide a method and apparatus for clustering web pages, where the method includes: acquiring Uniform Resource Locators (URLs) of a plurality of pages to be clustered; determining a rewriting rule of the URL of each page to be clustered, and classifying the URL according to the rewriting rule of the URL; and determining page frameworks of the pages corresponding to the respective URLs in the each URL class, determining whether the respective URLs can be clustered, according to the page frameworks of the pages corresponding to the respective URLs, and if so, then reserving the class. In embodiments of the invention, the URLs are classified according to their rewriting rules so that the URLs of the pages to be clustered are classified preliminarily; and thereafter the page frameworks are extracted, and the classes of the URLs are verified according to the page frameworks. With this solution in which firstly the URLs are classified, and then their classes are verified, the web pages in the same page framework can be clustered together to thereby address the problem in the prior art that web pages cannot be clustered based upon their framework, so as to provide a clustering method more applicable to web pages to be clustered based upon their framework.

BRIEF DESCRIPTION OF THE DRAWINGS

In order to make the technical solutions according to the embodiments of the invention more apparent, the drawings to which reference is to be made in the description of the embodiments will be introduced below in brief, and apparently the drawings to be described illustrate only a part but not all of the embodiments of the invention; and those ordinarily skilled in the art can further derive other drawings from these drawings without any inventive effort. In the drawings.

DETAILED DESCRIPTION OF THE EMBODIMENTS

In order to make the objects, technical solutions, and advantageous effects of the invention more apparent, the invention will be described below in further details with reference to the drawings and the embodiments thereof, and apparently the embodiments to be described illustrate only a part but not all of the embodiments of the invention. Based upon the embodiments here of the invention, all the other embodiments which can occur to those ordinarily skilled in the art without any inventive effort shall fall into the claimed scope of the invention.

Figure 1:
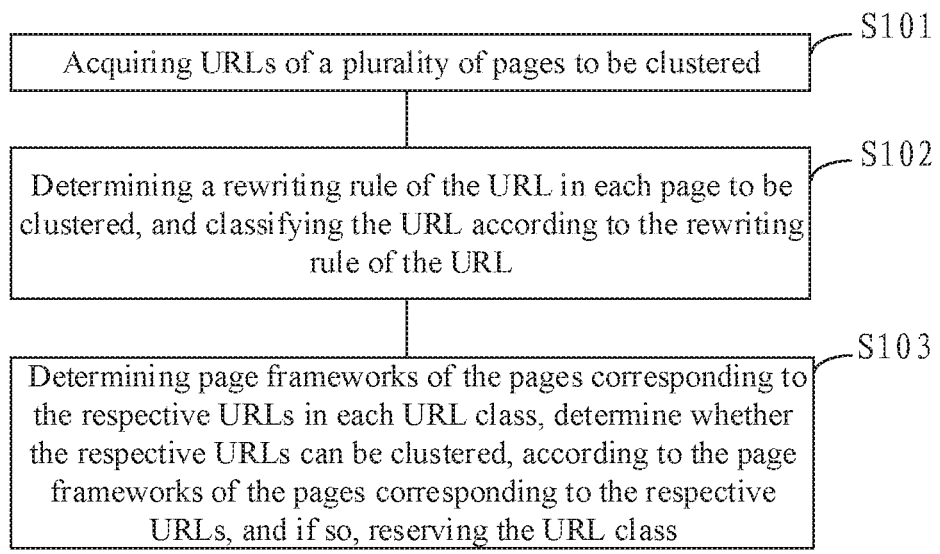
FIG. 1 is a schematic flow chart of a method for clustering web pages according to some embodiments of the invention.

FIG. 1 is a schematic flow chart of a method for clustering web pages according to some embodiments of the invention, and as illustrated in FIG. 1, the method includes the following steps.

The step S101 is to acquire Uniform Resource Locators (URLs) of a plurality of pages to be clustered.

The step S102 is to determine, for the URL of each page to be clustered, a rewriting rule of the URL, and to categorize the URL according to the rewriting rule of the URL.

The step S103 is to determine, for each URL class, page frameworks of the pages corresponding to the respective URLs in the URL class, to determine whether the respective URLs can be clustered, according to the page frameworks of the pages corresponding to the respective URLs, and if so, to reserve the URL class.

In a particular implementation, the clustering method according to embodiments of the invention can be applicable to vulnerability scanning for web pages but also applicable to searching and analyzing a web page, making a statistic of site data, etc.

In a particular implementation of the step S101, the Uniform Resource Locators (URLs) of the pages to be clustered can be acquired using a crawler algorithm. A URL is a brief representation of the position and an access mode of a resource available over the Internet, and is an address of a standard resource over the Internet. There is such a unique URL of each file over the Internet that includes information indicating the position of the file, and how a browser shall handle it. Each of the pages to be clustered has a URL specific thereto. Generally these pages to be clustered originate from the same root URL which is typically the homepage of a web site, and with the crawler algorithm, items of a web page are read, other link addresses in the web page are found, and then the next web page is located using these link address, and so on. The web reading is not stopped until all the web pages of the web site are crawled. Optionally, after the web pages are crawled, the duplicated web pages are removed, and the web pages undergoing deletion of duplicated web pages are determined as web pages to be clustered.

Figure 2:
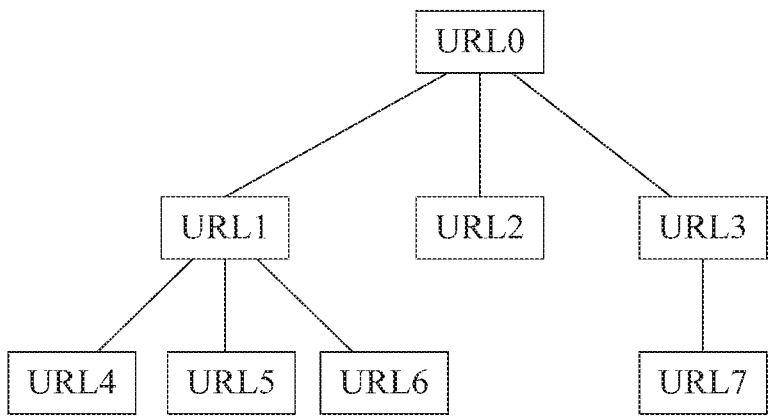
FIG. 2 is a schematic diagram of a site tree according to some embodiments of the invention.

Optionally, the URLs of the web pages to be clustered are stored in the form of a site tree. Levels of the URLs of the web pages to be clustered correspond to levels in the site tree. A URL is a leaf node on the site tree. FIG. 2 is a schematic diagram of a site tree according to some embodiments. As illustrated in FIG. 2, the site tree includes three levels in total, where the first level is a root URL0, the second level includes URL1, URL2, and URL3, and the third level includes URL4, URL5, URL6, and URL7, where URL4, URL5, and URL6 are sub-levels of URL1, and URL7 is a sub-level of URL3. Taking the home page of a web site, http://a, as an example, the eight URLs above will be described by way of an example, where http://a is URL0, http://a/b is URL1, http://a/c is URL2, http://a/d is URL3, http://a/b/e is URL4, http://a/b/f is URL5, http://a/b/g is URL6, and http://a/b/h is URL7.

In a particular implementation of the step S102, the rewriting rule is a rule for characterizing a redirected URL at the same level and with the same directory characteristic, and URLs with the same characterization rule are clustered together. For example, URLs at the same level which is the third level in FIG. 2 include URL4: http://a/b/e, URL5: http://a/b/f, URL6: http://a/b/g, URL7: http://a/b/h, where all of URL4, URL5, and URL 6 are sub-URLs of URL1: http://a/b, so they have the same directory characteristic, and a rewriting rule shall be extracted from URL4, URL5, and URL6. Here the rewriting rule particularly refers to a rule for representing a URL, and for example, a rewriting rule extracted from URL http://ent.163.com/photoview/615398.html and http://ent.163.com/photoview/615409.html is http://ent.163.com/photoview/%6d.htm, where %6d represents that a html filename of a URL includes six digits, and http://ent.163.com/photoview represents a directory characteristic of these two URLs.

Optionally, some embodiments of the invention provides a method for classifying URLs according to a rewriting rule, where the method includes the steps of: determining URLs of a plurality of pages to be clustered as a set of URLs; extracting rewriting rule of two different URLs from any two different URLs in the set of URLs; determining whether the rewriting rule of the two different URLs is a trustable rewriting rule, and if so, then searching the set of URLs for URLs satisfying the trustable rewriting rule, and determining those URLs as the same URL class; and deleting the URLs in the same URL class from the set of URLs, and returning to the step of extracting a rewriting rule of two different URLs from any two different URLs in the set of URLs. In a particular implementation, taking a set A of URLs as an example, where A={URLa, URLb, URLc, URLd, URLe}, any two URLs e.g., URLa and URLd, are selected from the set A, a rewriting rule of these two URLs is extracted according to their representation, and then it is determined whether the rewriting rule is trustable, and if so, then the set A will be searched for URLs satisfying the trustable rewriting rule, and these URLs will be determined as the same URL class, and for example, URLe also satisfies the rewriting rule, so URLa, URLd, and URLe are of the same URL class; and thereafter URLa, URLd, and URLe are deleted from the set A, and then the operations are not repeated for the remaining URLs in the set A until all the URLs are classified. Optionally, if the rewriting rule extracted from URLa and URLd is not trustable, then two further URLs will be extracted from URLc, URLb, and URLe, and the process above will be repeated, or URLa may be reserved, and a rewriting rule may be extracted from URLa and further one of URLc, URLb, and URLe.

Some embodiments of the invention provide a method for determining whether a rewriting rule is trustable, where the method includes the steps of: if a representation form of the rewriting rule is all letters or all digits, the number of which is not determinate, then the rewriting rule will not be trustable. For example, a rule generated from Ewafoij.html and 2323232.htm is {.%d}, i.e., a rule in which the number of digits is not determinate, so the rule is not trustable; and optionally, other URLs than URLs which are not trustable are further classified into trustable rules and partially trustable rules, and for example, a rule generated from 111.htm and 222.htm is .%3d.html, i.e., three digital characters, and this rule is a trustable rule; and for example, a rule generated from abcd_cdf001 and abcd_wxyzm is abcd_.{%d}, and although there are determinate letter characters, the number of digital characters in {%d} is not determinate, so it is a partially trustable URL. Optionally, the partially trustable URLs, and the URLs which are not trustable are stored in a characteristics base, and when all the URLs to be clustered are traversed, but there is no trustable URL, the partially trustable URLs, or the URLs which are not trustable are retrieved from the characteristics base, and clustered.

Table 1 depicts a rule for classifying URLs according to a rewriting rule according to some embodiments of the invention, and as depicted in Table 1, the serial number 1 refers to a first rule that URLs are classified according to a rewriting rule of URLs at the lowest level, the serial number 2 refers to a second rule that URLs are classified according to a rewriting rule of URLs at the lowest level, and URLs at the second lowest level, and the serial number 3 refers to a third rule that URLs are classified according to a rewriting rule of URLs at the lowest level, URLs at the next lowest level, and URLs at the still next lowest level.

TABLE 1

| Serial No. | URL Pattern | Rewriting Rule |
| --- | --- | --- |
| 1 | http://a/b/c/d/e<br>http://a/b/c/d/f<br>http://a/b/c/d/g | http://a/b/c/d/%8d |
| 2 | http://a/b/c/d/e<br>http://a/b/c/h/f<br>http://a/b/c/i/g | http://a/b/c/%9s/%8d |
| 3 | http://a/b/j/d/e<br>http://a/b/k/h/f<br>http://a/b/c/i/g | http://a/b/%5s/%9s/%8d |

Optionally, in a particular implementation of the step S103, determining, for each URL class, the page frameworks of the pages corresponding to the respective URLs in the URL class, determining whether the respective URLs can be clustered, according to the page frameworks of the pages corresponding to the respective URLs, and if so, then reserving the URL class particularly includes: acquiring, for each URL in the respective URL class, a Hyper Text Markup Language (HTML) file of a page corresponding to the URL; acquiring fingerprint characteristic values of the HTML file is according to labels in the HTML file; determining whether the differences between the fingerprint characteristic values of the respective URLs are below a preset threshold; and if so, then it will be determined that the respective URLs can be clustered. The HTML file includes a link a picture audio program, and other non-text elements in the web page, and the fingerprint characteristic values extracted according to the labels in the HTML file can better characterize a framework of the web page.

Optionally, acquiring the fingerprint characteristic values of the HTML file according to the label in the HTML file particularly includes: extracting attribute values of the respective labels from the HTML file, where different attributes correspond to their respective attribute weights; determining positional weights of the respective labels according to different positions of the respective labels in the HTML file; and acquiring the fingerprint characteristic values of the HTML, file according to the positional weights of the respective labels, and the attribute values and the attribute weights of the different attributes in the respective labels. The HTML file includes a plurality of labels, and each label further includes a plurality of attributes. After the attribute values of these attributes are extracted, the fingerprint characteristic values are calculated using the attribute values. Optionally, acquiring the fingerprint characteristic values of the HTML file according to the positional weights of the respective labels, and the attribute values and the attribute weights of the different attributes in the respective labels includes: positions in the HTML file include three components at head, middle and tail positions, where the positional weight of a label at the head position is higher than the positional weight of a label at the middle position, and the positional weight of a label at the tail position is higher than the positional weight of the label at the middle position; and attributes of a label include an Identity (ID) attribute, a Class attribute, and non-typical attributes including other attributes than the ID and Class attributes, where the attribute weight of the ID attribute is higher than the attribute weight of a non-typical attribute, and the attribute weight of the Class attribute is higher than the attribute weight of the non-typical attribute. These extracted attribute values of the labels are weighted according to the positions of the labels in the HTML file, where a weight represents an influence factor of an attribute value on a fingerprint characteristic value. For example, the HTML file is divided into three components including head, middle, and tail components, and a large-data analysis shows a more significant influence of the head and tail components on a fingerprint characteristic value, so attribute values of labels at the head and the tail are allocated with higher weights. Optionally, the fingerprint characteristic values of the HTML file are calculated using a hash algorithm, and while they are being calculated, respective attribute values of a label are also weighted, and since the attribute values of the ID and Class attributes in the labels are characterized in being sensitive to the framework of the web page, the attribute values of the ID and Class attributes are weighted higher than the other attribute values in the same label.

After the fingerprint characteristic values of the respective URLs are acquired, it is determined whether the differences between the fingerprint characteristic value of the respective URLs in the same URL class are below the preset threshold; and if so, then it will be determined that the respective URLs can be clustered. Optionally, when the differences between the fingerprint characteristic value of the respective URLs in the same URL class are compared with the preset threshold, it is not required that the difference between fingerprint characteristic values of any two URLs be below the preset threshold but a trust factor criterion may be set as needed in reality, and when the ratio of the number of pairs of URLs satisfying the preset threshold to the total number of pairs of URLs is not less than the trust factor criterion, it is determined that the URLs in the URL class can be clustered. For example, for a URL class {URL1, URL2, URL3, URL4, URL5}, the trust factor criterion is preset to 80%, and there are ten pairs of URLs from these five URLs, so if there are eight pairs of URLs satisfying the preset threshold, then the trust factor of this URL class will be 80% satisfying the trust factor criterion, so the URLs in the URL class can be clustered; and if there are six pairs of URLs satisfying the preset threshold, then the trust factor of this URL class will be 60% which does not satisfy the trust factor criterion, so the URLs in the URL class can be not clustered.

Optionally, there is a dynamic tradeoff between the preset threshold, and zones of the web pages and weighs of the respective zones, that is, when the preset threshold is acquired, for some number of web pages in the same web page framework, their zones are adjusted in proportion, and the zones are weighted so that the preset threshold is controlled to be a desirable value.

It shall be noted that the web pages for which the fingerprint characteristic values are acquired may not have exactly the same framework, but the fingerprint characteristic values can be used to verify the URL class for correctness, that is, URLs which can satisfy both the redirection rule and the web page framework comparison can be determined to be the same class of URLs.

Figure 3:
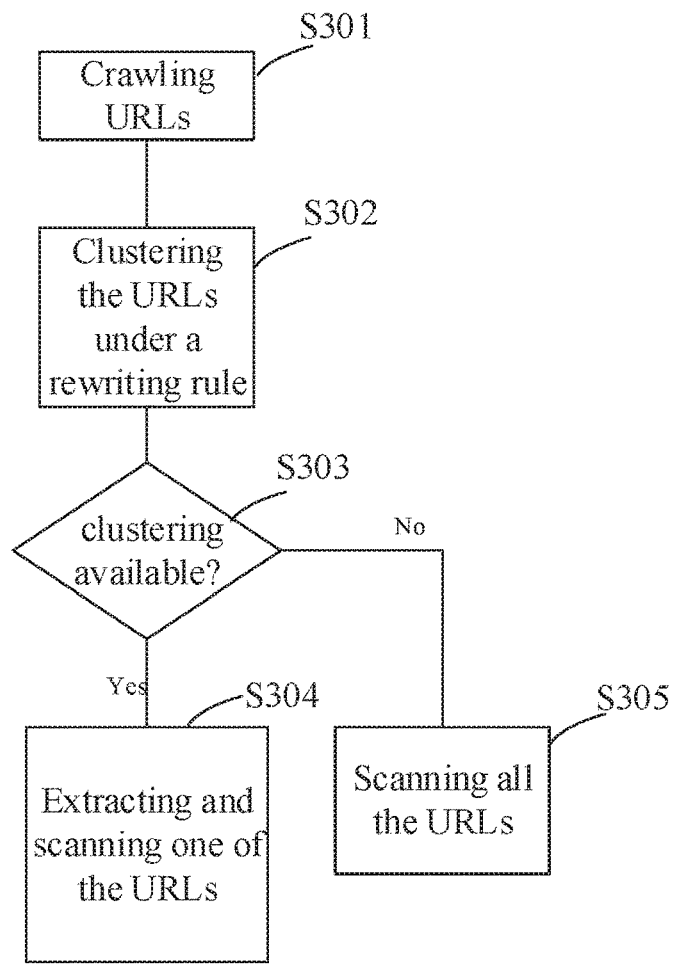
FIG. 3 is a schematic flow chart of vulnerability scanning by clustering web pages according to some embodiments of the invention.

FIG. 3 is a schematic flow chart of vulnerability scanning by using a cluster of web pages according to some embodiments of the invention, and as illustrated, the flow includes the following steps.

The step S301 is to crawl by a crawler all the URLs of a site, and to store them in the form of a site tree.

The step S302 is to cluster the crawled URLs under a rewriting rule.

The step S303 is to determine whether a set of URLs clustered into a class can be clustered according to their page frameworks, and if so, to proceed to the step S304; otherwise, to proceed to the step S305.

The step S304 is to extract one of the URLs, and to scan a web page thereof, where vulnerability conditions of the other URLs in the URL class agree with a result of scanning the URL.

The step S305 is to scan all the web pages of the respective URLs in the URL class.

With the additional step S302 of clustering and analyzing the web pages, only one of the web pages will be scanned in the step S304 to thereby determine the vulnerability conditions of the other web pages in the same class as the web page so as to lower in effect the amount of system and network resources to be consumed by a plug-in component of a web page vulnerability scanner, thus improving the efficiency of scanning by the web page scanner.

In summary, embodiments of the invention provide a method for clustering web pages, where the method includes: acquiring Uniform Resource Locators (URLs) of a plurality of pages to be clustered; determining, for the URL of each page to be clustered, a rewriting rule of the URL, and classifying the URL according to the revolting rule of the URL; and determining, for each URL class, page frameworks of the pages corresponding to the respective URLs in the URL class, determining whether the respective URLs can be clustered, according to the page frameworks of the pages corresponding to the respective URLs, and if so, then reserving the URL class. In the embodiment of the invention, the URLs are classified according to their rewriting rules so that the URLs of the pages to be clustered are classified preliminarily; and thereafter the page frameworks are extracted, and the classes of the URLs are verified according to the page frameworks. With this solution in which firstly the URLs are classified, and then their classes are verified, the web pages in the same page framework can be clustered together to thereby address the problem in the prior art that web pages cannot be clustered based upon their framework, so as to provide a clustering method more applicable to web pages to be clustered based upon their framework.

Figure 4:
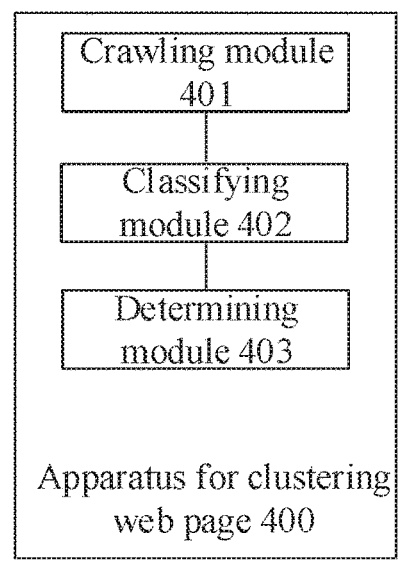
FIG. 4 is a schematic structural diagram of an apparatus for clustering web pages according to some embodiments of the invention.

Based upon the same inventive idea, some embodiments of the invention further provide an apparatus for clustering web pages, and the apparatus can perform the method according to embodiments above of the invention. FIG. 4 is a schematic structural diagram of an apparatus for clustering web pages according to some embodiments of the invention, and as illustrated in FIG. 4, the apparatus 400 for clustering web pages includes: a crawling module 401, a classifying module 402, and a determining module 403.

The crawling module 401 is configured to acquire Uniform Resource Locators (URLs) of a plurality of pages to be clustered.

The classifying module 402 is configured to determine, for the URL of each page to be clustered, a rewriting rule of the URL, and to classify the URL according to the rewriting rule of the URL.

The determining module 403 is configured to determine, for each URL class, page frameworks of the pages corresponding to the respective URLs in the URL class, to determine whether the respective URLs can be clustered, according to the page frameworks of the pages corresponding to the respective URLs, and if so, to reserve the URL class.

Optionally, the classifying module 402 is configured:
  to determine the URLs to the plurality of pages to be clustered as a set of URLs;
  to extract a rewriting rule of two different URLs from any two different URLs in the set of URLs;

to determine whether the rewriting rule of the two different URLs is a trustable rewriting rule, and if so, to search the set of URLs for URLs satisfying the trustable rewriting rule, and determining those URLs as the same URL class; and to delete the URLs in the same URL class from the set of URLs, and to return to the operation of extracting a rewriting rule of two different URLs from any two different URLs in the set of URLs.

Optionally, the classifying module 402 is configured:

to extract a first URL and a second URL from the set of URLs, and to determine a rewriting rule of the first URL and the second URL.

The classifying module 402 is further configured:

when the rewriting rule of the first URL and the second URL is a rewriting rule which is not trustable, to extract a third URL and a fourth URL from the set of URLs, to determine a rewriting rule of the third URL and the fourth URL and to return to the operation of determining the rewriting rule of the two different URLs is a trustable rewriting rule, where at least one of the third URL and the fourth URL is another URL in the set of URLs than the first URL and the second URL.

Optionally, if a representation form of the rewriting rule is all letters or all digits, the number of which is not determinate, then the rewriting rule will be not trustable.

Optionally, the determining module 403 is configured:

to acquire, for each URL in the respective URL class, a Hyper Text Markup Language (HTML) file of a page corresponding to the URL; and to acquire fingerprint characteristic values of the HTML file according to labels in the HTML file;

to determine whether the differences between the fingerprint characteristic values of the respective URLs are below a preset threshold; and if so, to determine that the respective URLs can be clustered.

Optionally, the determining module 403 is configured:

to extract attribute values of the respective labels from the HTML file, where different attributes correspond to their respective attribute weights;

to determine positional weights of the respective labels according to different positions of the respective labels in the HTML file; and to acquire the fingerprint characteristic values of the HTML file according to the positional weights of the respective labels, and the attribute values and the attribute weights of the different attributes in the respective labels.

Optionally, the determining module 403 is configured:

to divide the HTML file into three components including head, middle, and tail components, where the positional weight of a label at the head position is higher than the positional weight of a label at the middle position, and the positional weight of a label at the tail position is higher than the positional weight of the label at the middle position; and to determine attributes of a label as an identity attribute a class attribute, and non-typical attributes including other attributes than the identity and class attributes, where the attribute weight of the identity attribute is higher than the attribute weight of a non-typical attribute, and the attribute weight of the class attribute is higher than the attribute weight of the non-typical attribute.

In summary, the embodiments of the invention provide a method and apparatus for clustering web pages, where the method includes: acquiring Uniform Resource Locators (URLS) of a plurality of pages to be clustered; determining, for the URL of each page to be clustered, a rewriting rule of the URL, and classifying the URL according to the rewriting rule of the URL; and determining, for each URL class, page frameworks of the pages corresponding to the respective URLs in the URL class, determining whether the respective URLs can be clustered, according to the page frameworks of the pages corresponding to the respective URLs, and if so, then reserving the URL class. In embodiments of the invention, the URLs are classified according to their rewriting rules so that the URLs of the pages to be clustered are classified preliminarily; and thereafter the page frameworks are extracted, and the classes of the URLs are verified according to the page frameworks. With this solution in which firstly the URLs are classified, and then their classes are verified, the web pages in the same page framework can be clustered together to thereby address the problem in the prior art that web pages cannot be clustered based upon their framework, so as to provide a clustering method more applicable to web pages to be clustered based upon their framework.

Figure 5:
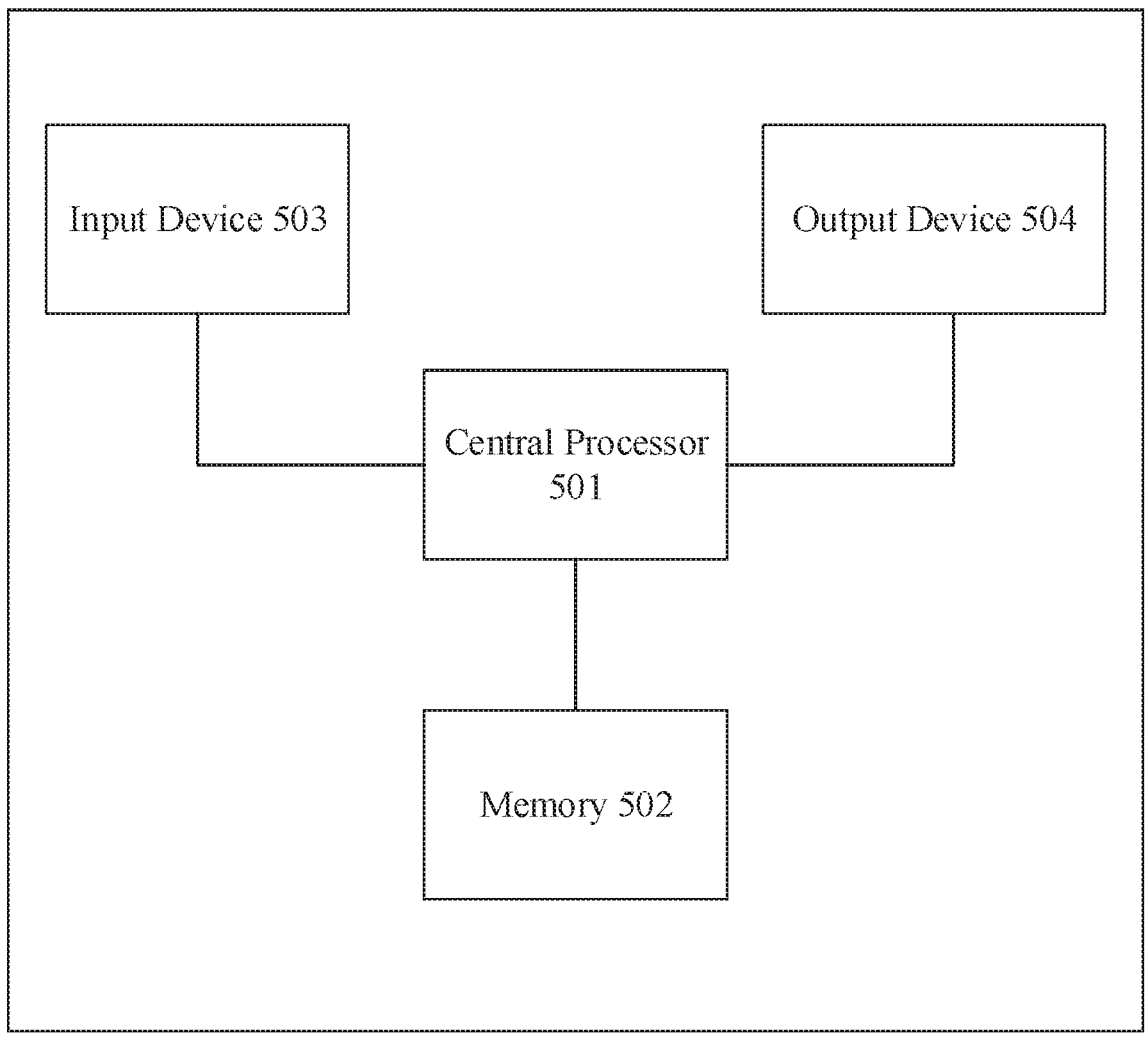
FIG. 5 is a schematic structural diagram of a computing device according to some embodiments of the invention.

Based upon the same inventive idea, some embodiments of the invention further provides a computing device, which can particularly be a desktop computer, a portable computer, a smart mobile phone, a tablet computer, a Personal Digital Assistant (PDA), etc. FIG. 5 illustrates a schematic structural diagram of a computing device according to some embodiments of the invention, where the computing device can include a Central Processing Unit (CPU) 501, a memory 502, an input device 503, an output device 504, etc., the input device 503 can include a keyboard, a mouse, a touch screen, and the output device 504 can include a display device, e.g., a Liquid Crystal Display (LCD), a Cathode Ray Tube (CRT) display, etc.

The memory 502 can include a Read-Only Memory (ROM) and a Random Access Memory (RAM), and provides the processor with program instructions and data stored in the memory. In the embodiment of the invention, the memory can be configured to store program for performing the method according to any one of the embodiments above of the invention, and the processor can be configured to invoke the program instructions stored in the memory, and to perform the method according to any one of the embodiments above of the invention according to the invoked program instructions.

Based upon the same inventive idea, some embodiments of the invention further provide a computer readable storage medium for storing computer program instructions to be executed by the computing device above, which includes program for performing the method according to any one of the embodiments above of the invention.

The computer storage medium can be any computer accessible available medium or data storage device including but not limited to a magnetic memory (e.g., a floppy disk, a hard disk, a magnetic tape, a Magnetic-Optical (MO) disk, etc.), an optical memory (e.g., a CD, a DVD, a BD, an HVD, etc.), a semiconductor memory (e.g., an ROM, an EPROM, an EEPROM, a nonvolatile memory (NAND FLASH), a Solid State Disk (SSD), etc.), etc.

Based upon the same inventive idea, some embodiments of the invention further provide a computer program product for causing a computer upon being executed on the computer to perform the method according to any one of the embodiments above of the invention.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for clustering web pages, the method comprising:
    acquiring Uniform Resource Locators (URLs) of a plurality of pages to be clustered;
    determining URLs of the plurality of pages to be clustered as a set of URLs;
    extracting a rewriting rule of two different URLs from any two different URLs it the set of URLs;
    determining whether the rewriting rule of the two different URLs is a trustable rewriting rule, and if so, searching the set of URLs for URLs satisfying the trustable rewriting rule, and determining the URLs satisfying the trustable rewriting rule as a same URL class;
    deleting the URLs in the same URL class from the set of URLs, and returning to a step of extracting a rewriting rule of two different URLs from any two different URLs in the set of URLs;
    determining page frameworks of the pages corresponding to respective URLs in a URL class, determining whether the respective URLs can be clustered, according to the page frameworks of the pages corresponding to the respective URLs, and if so, reserving the URL class;
    wherein extracting the rewriting rule of two different URLs from the any two different URLs in the set of URLs comprises:
    extracting a first URL and a second URL from the set of URLs, and determining a rewriting rule of the first URL and the second URL; and
    the method further comprises:
    if the rewriting rule of the first URL and the second URL is a rewriting rule which is not trustable, extracting a third URL and a fourth URL from the set of URLs, determining a rewriting rule of the third URL, and the fourth URL, and returning to a step of determining the rewriting rule of the two different URLs is a trustable rewriting rule, wherein at least one of the third URL and the fourth URLs another URL in the set of URLs than the first URL and the second URL.

2. The method according to claim 1, wherein determining the page frameworks of the pages corresponding to the respective URLs in the URL class, determining whether the respective URLs can be clustered, according to the page frameworks of the pages corresponding to the respective URLs comprises:
    acquiring a Hyper Text Markup Language (HTML) file of a page corresponding to each URL in the respective URL classes; and acquiring fingerprint characteristic values of the HTML file according to labels in the HTML file;
    determining whether differences between the fingerprint characteristic values of the respective URLs are below a preset threshold; and
    if so, determining that the respective URLs can be clustered.

3. The method according to claim 2, wherein acquiring the fingerprint characteristic values of the HTML file according to the labels in the HTML file comprises:
    extracting attribute values of the respective labels from the HTML file, wherein different attributes correspond to respective attribute weights;
    determining positional weights of the respective labels according to different positions of the respective labels in the HTML file; and
    acquiring the fingerprint characteristic values of the HTML file according to the positional weights of the respective labels, and the attribute values and the attribute weights of the different attributes in the respective labels.

4. The method according to claim 3, wherein acquiring the fingerprint characteristic values of the HTML file according to the positional weights of the respective labels, and the attribute values and the attribute weights of the different attributes in the respective labels comprises:
    dividing the HTML file into three components comprising head, middle, and tail components, wherein a positional weight of a label at the head position is higher than a positional weight of a label at the middle position, and a positional weight of a label at the tail position is higher than a positional weight of the label at the middle position; and
    determining attributes of a label as an identity attribute, a class attribute, and non-typical attributes comprising other attributes than the identity and class attributes, wherein an attribute weight of the identity attribute is higher than an attribute weight of a non-typical attribute, and an attribute weight of the class attribute is higher than an attribute weight of the non-typical attribute.

5. An apparatus for clustering web pages, the apparatus comprising: a memory configured to store program instructions; and
    a processor configured to execute the program instructions stored in the memory, and to perform the method according to claim 1 according to executed program instructions.

6. The apparatus according to claim 5, wherein the processor is configured to execute the program instructions stored in the memory:
    to acquire a Hyper Text Markup Language (HTML) file of a page corresponding to each URL in the respective URL classes; and to acquire fingerprint characteristic values of the HTML file according to labels in the HTML file;
    to determine whether differences between the fingerprint characteristic values of the respective URLs are below a preset threshold; and
    if so, to determine that the respective URLs can be clustered.

7. The apparatus according to claim 6, wherein the processor is configured to execute the program instructions stored in the memory:
    to extract attribute values of the respective labels from the HTML file, wherein different attributes correspond to their respective attribute weights;
    to determine positional weights of the respective labels according to different positions of the respective labels in the HTML file; and
    to acquire the fingerprint characteristic values of the HTML file according to the positional weights of the respective labels, and the attribute values and the attribute weights of the different attributes in the respective labels.

8. The apparatus according to claim 7, wherein the processor is configured to execute the program instructions stored in the memory:
   to divide the HTML file into three components comprising head, middle, and tail components, wherein a positional weight of a label at the head position is higher than a positional weight of a label at the middle position, and a positional weight of a label at the tail position is higher than a positional weight of the label at the middle position; and
   to determine attributes of a label as an identity attribute, a class attribute, and non-typical attributes comprising other attributes than the identity and class attributes, wherein an attribute weight of the identity attribute is higher than an attribute weight of a non-typical attribute, and an attribute weight of the class attribute is higher than an attribute weight of the non-typical attribute.

9. A nonvolatile computer readable storage medium, storing computer executable instructions for causing a computer upon being executed on the computer to perform the method according to claim 1.

* * * * *